United States Patent
Billore et al.

(10) Patent No.: US 9,559,904 B2
(45) Date of Patent: *Jan. 31, 2017

(54) DYNAMIC AGENT REPLACEMENT WITHIN A CLOUD NETWORK

(71) Applicant: International Business Machines Corporation, Armonk, NY (US)

(72) Inventors: Ashish Billore, Bangalore (IN); Divya K. K, Bangalore (IN); Nanjangud C. Narendra, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 329 days.

This patent is subject to a terminal disclaimer.

(21) Appl. No.: 14/100,159

(22) Filed: Dec. 9, 2013

(65) Prior Publication Data

US 2015/0081857 A1 Mar. 19, 2015

Related U.S. Application Data

(63) Continuation of application No. 14/031,069, filed on Sep. 19, 2013.

(51) Int. Cl.
*H04L 12/24* (2006.01)
*H04L 12/26* (2006.01)

(52) U.S. Cl.
CPC ......... *H04L 41/0816* (2013.01); *H04L 41/046* (2013.01); *H04L 43/0817* (2013.01)

(58) Field of Classification Search
CPC ...... H04L 43/10; H04L 43/41; H04L 43/0816; H04L 41/046; H04L 43/0817
See application file for complete search history.

(56) References Cited

U.S. PATENT DOCUMENTS

| 5,787,409 A | 7/1998 | Seiffert et al. |
| 6,308,208 B1 | 10/2001 | Jung et al. |
| 7,203,868 B1 | 4/2007 | Evoy |
| 7,703,091 B1 | 4/2010 | Martin et al. |
| 7,779,112 B2 | 8/2010 | Herrmann et al. |

(Continued)

FOREIGN PATENT DOCUMENTS

| EP | 1320217 B1 | 10/2004 |
| WO | 2010005545 A1 | 1/2010 |

OTHER PUBLICATIONS

"A Method and Apparatus for Automated Placement & Configuration of System Monitors in Cloud Environments", Publication date: Sep. 26, 2012, IP.com Disclosure Number: IPCOM000222358D, retrieved from website: ip.com/IPCOM/000222358, Copyright © 2009-2012 IP.com.

(Continued)

*Primary Examiner* — Nimesh G Patel
(74) *Attorney, Agent, or Firm* — Erik K. Johnson

(57) ABSTRACT

A computing device receives information from one or more agents, wherein the one or more agents monitor one or more resources in a cloud network. The computing device determines that the configuration of the one or more agents monitoring the one or more resources needs to be changed based on at least the information received from the one or more agents. The computing device changes the configuration of the one or more agents monitoring the one or more resources based on at least the information received from the one or more agents.

7 Claims, 4 Drawing Sheets

(56) References Cited

U.S. PATENT DOCUMENTS

| | | | | |
|---|---|---|---|---|
| 2009/0204702 A1* | 8/2009 | Jensen | ............... | H04L 41/046 709/224 |
| 2010/0205294 A1 | 8/2010 | Bouchex Bellomie | | |
| 2012/0179802 A1* | 7/2012 | Narasimhan | .......... | H04L 41/046 709/223 |
| 2012/0259960 A1 | 10/2012 | Sharma et al. | | |
| 2013/0080619 A1* | 3/2013 | Assuncao | ........... | G06F 9/45558 709/224 |

OTHER PUBLICATIONS

U.S. Appl. No. 14/031,069, entitled "Dynamic Agent Replacement Within a Cloud Network", filed Sep. 19, 2013.
Zhu, Abstract for "An approach to automated agent deployment in service-based systems", 2008 Doctoral Dissertation, Arizona State University, 2 pages.
Fang et al., "A New Dynamic Network Monitoring Method based on IA", 2008 International Symposium on Computer Science and Computational Technology, 2008 IEEE, pp. 637-640.
Oracle®, "Discovering, Promoting, and Adding Targets", Enterprise Manager Cloud Control Administrator's Guide, printed on Jul. 5, 2016, 60 pages.

* cited by examiner

DYNAMIC AGENT REPLACEMENT WITHIN A CLOUD NETWORK

CROSS REFERENCE TO RELATED APPLICATION

This application is a Continuation Application of pending U.S. patent application Ser. No. 14/031,069 filed Sep. 19, 2013.

FIELD OF THE INVENTION

The present disclosure relates generally to network management, and more particularly to the dynamic deployment and configuration of agents for management servers in a cloud network.

BACKGROUND

Cloud environments today are large and diverse, comprising many types of resources, e.g., servers, virtual servers, switches, storage, routers, etc. These resources need to be monitored and managed effectively. To that end, optimal placement, removal, and configuration of monitoring agents is crucial to proper maintenance and upkeep of resources within a cloud network. Monitoring agents are in widespread use to monitor infrastructure, software, packaged applications, etc., across a network. Typical monitoring agents are not plug-n-play products and in large-scale deployments, configuration and manageability of the agent itself becomes very difficult. For example, a large cloud network system may involve a plurality of resources, requiring an administrator with extensive knowledge of agents to manually configure and deploy agents to cloud resources. This strenuous process takes not only copious amounts of time, but also extensive knowledge of monitoring agent behavior, deployment, placement, and configuration based on the needs of those resources and specific capability of agents for the purpose.

SUMMARY

Embodiments of the present invention provide a system, method, and program product for auto-configuration, deployment, and placement of agents in a cloud network. The computing device receives information from one or more agents wherein the one or more agents monitor one or more resources in a cloud network. The computing device determines that the configuration of the one or more agents monitoring the one or more resources needs to be changed based on at least the information received from the one or more agents. The computing device changes the configuration of the one or more agents monitoring the one or more resources based on at least the information received from the one or more agents.

DETAILED DESCRIPTION

Figure 1:
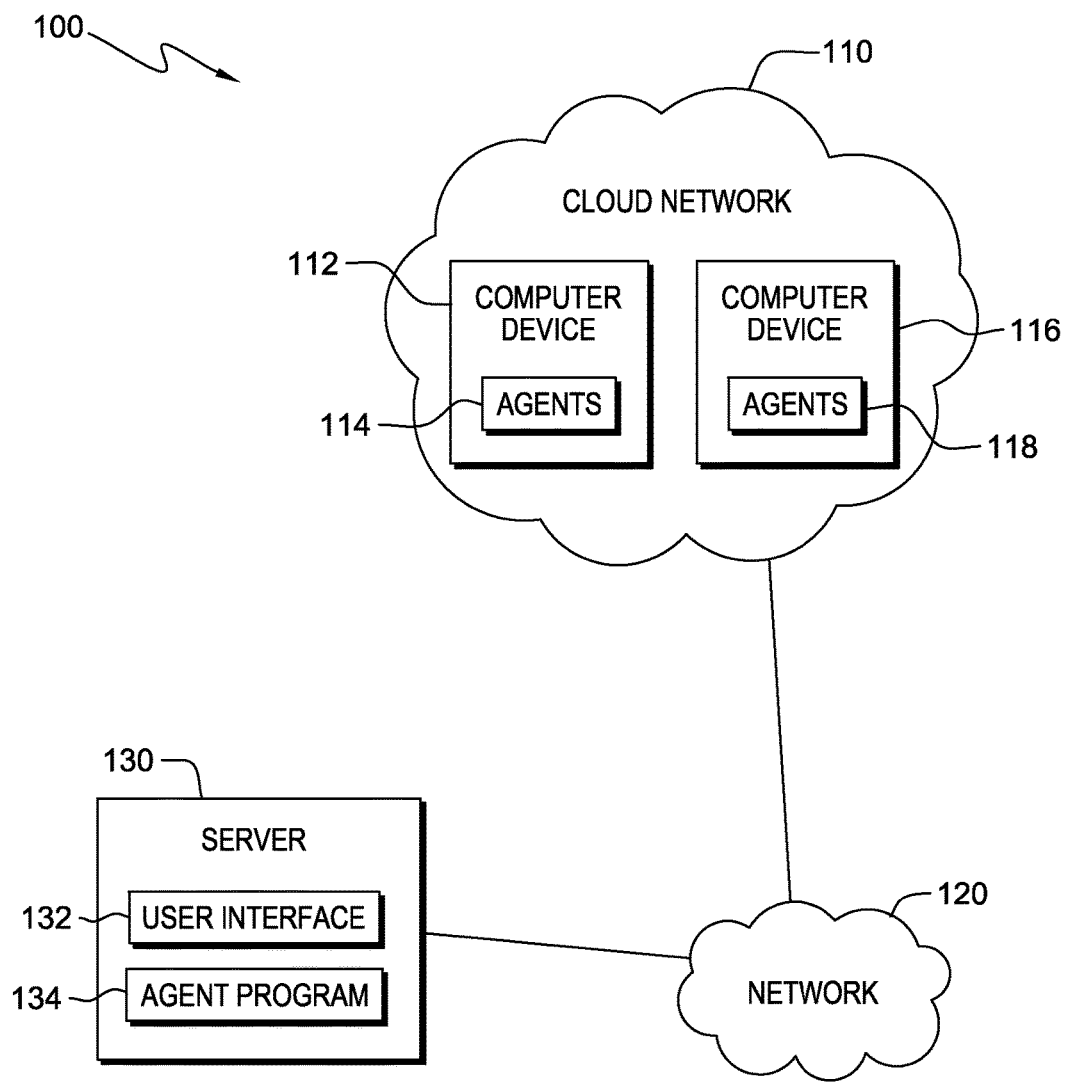
FIG. 1 is a functional block diagram illustrating a dynamic agent replacement system in accordance with an embodiment of the present invention.

As will be appreciated by one skilled in the art, embodiments of the present invention may be embodied as a system, method, or computer program product. Accordingly, embodiments of the present invention may take the form of an entirely hardware embodiment, an entirely software embodiment (including firmware, resident software, microcode, etc.), or an embodiment combining software and hardware aspects that may all generally be referred to herein as a "circuit," "module," or "system." Furthermore, embodiments of the present invention may take the form of a computer program product embodied in one or more computer-readable medium(s) having computer-readable program code/instructions embodied thereon.

Any combination of one or more computer readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms including, but not limited to, electromagnetic, optical, or any suitable combination thereof. A computer-readable signal medium may be any computer-readable medium that is not a computer-readable storage medium that can communicate, propagate, or transport a program for use by or in connection with an instruction execution system, apparatus, or device.

Program code embodied on a computer-readable medium may be transmitted using any appropriate medium including, but not limited to, wireless, wireline, optical fiber cable, RF, etc., or any suitable combination of the foregoing.

Computer program code for carrying out operations for embodiments of the present invention may be written in any combination of one or more programming languages, including an object oriented programming language such as Java®, Smalltalk, C++ or the like, and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures.

FIG. 1 illustrates dynamic agent replacement system 100, in accordance with an embodiment of the present invention. In an exemplary embodiment, dynamic agent replacement system 100 includes cloud network 110 and server 130, all interconnected via network 120.

In the exemplary embodiment, network 120 is the Internet, representing a worldwide collection of networks and gateways to support communications between devices connected to the Internet. Network 120 may include, for example, wired, wireless, or fiber optic connections. In other embodiments, network 120 may be implemented as an intranet, a local area network (LAN), or a wide area network (WAN). In general, network 120 can be any combination of connections and protocols that will support communications between cloud network 110 and server 130.

In the exemplary embodiment, cloud network 110 may be a desktop computer, a notebook, a laptop computer, a tablet computer, a handheld device, a smart phone, a thin client, or any other computing device or computing system capable of receiving and sending data to and from other computing devices, such as server 130. Cloud network 110 may be comprised of a cluster of a plurality of computing devices, working together or working separately. In the exemplary embodiment, cloud network 110 includes computing device 112, computing device 116, agents 114 and agents 118. In other embodiments, cloud network 110 may also include server 130 and agent program 134. Cloud network 110 is described in more detail with reference to FIG. 4.

In the exemplary embodiment, computing device 112 may be a laptop computer, tablet computer, notebook computer, personal computer (PC), a desktop computer, a personal digital assistant (PDA), a smart phone, or any programmable electronic device capable of communication with server 130 via network 120. In the exemplary embodiment, computing device 112 includes agents 114. Computing device 112 may include internal and external hardware components, as depicted and described in further detail with respect to FIG. 4.

In the exemplary embodiment, computing device 116 may be a laptop computer, tablet computer, notebook computer, personal computer (PC), a desktop computer, a personal digital assistant (PDA), a smart phone, or any programmable electronic device capable of communication with server 130 via network 120. In the exemplary embodiment, computing device 116 includes agents 118; computing device 116 may include internal and external hardware components, as depicted and described in further detail with respect to FIG. 4.

In the exemplary embodiment, agents 114 are agents deployed and placed on computing device 112 from server 130, via network 120. In the exemplary embodiment, agents 114 monitor the status of computing device 112. The data received by agents 114 while monitoring computing device 112 may include changes in the amount of memory and CPU availability, changes in the amount of data that the agents are required to capture and changes in the amount of traffic within computing device 112. Once data is received, agents 114 transmit the data to server 130 via network 120.

In the exemplary embodiment, agents 118 are agents deployed and placed on computing device 116 from server 130, via network 120. In the exemplary embodiment, agents 118 monitor the status of computing device 116. The data received by agents 118 while monitoring computing device 116 may include changes in the amount of memory and CPU availability, changes in the amount of data that the agents are required to capture, and changes in the amount of traffic within computing device 116. Once data is received, agents 118 transmit the data to server 130 via network 120.

In the exemplary embodiment, server 130 may be a laptop computer, tablet computer, notebook computer, personal computer (PC), a desktop computer, a personal digital assistant (PDA), a smart phone, or any programmable electronic device capable of communication with cloud network 110 via network 120. In the exemplary embodiment, server 130 includes user interface 132 and agent program 134. In addition, server 130 receives data from agents 114 and 118 regarding the status of computing device 112 and computing device 116. Server 130 may include internal and external hardware components, as depicted and described in further detail with respect to FIG. 4.

In the exemplary embodiment, user interface 132 includes components used to receive input from a user of server 130 and transmit the input to agent program 134. User interface 132 uses a combination of technologies, such as device drivers, to provide a platform to enable users to interact with agent program 134. In the exemplary embodiment, user interface 132 receives user input criteria which may include the type of resources agents 114 and agents 118 are monitoring, basic resource performance and health to identify if advanced monitoring using agents 114 and agents 118 is required, the hardware and software elements that need monitoring, and the amount of traffic predicted to arrive at the resources received from a physical input device, such as a keyboard, via a device driver that corresponds to the physical input device.

In the exemplary embodiment, agent program 134 is software capable of receiving data, such as data from agents 114 and agent 118 via network 120. Agent program 134 is also capable of transmitting data to other computing devices, e.g., computing devices in cloud network 110, such as computing device 112 and computing device 116 via network 120. In the exemplary embodiment, agent program 134 receives data from agents 114 and agents 118 and determines, based on the received data and user/default criteria, whether agents 114 and agents 118 need to be replaced and/or if there is a change in the number of agents that is needed. In addition, agent program 134 determines the correct placement of the agents within computing device 112 and computing device 116 based on received data from agents 114 and agents 118, as well as user input/default criteria. Agent program 134 is discussed in further detail with regard to FIG. 2.

Figure 2:
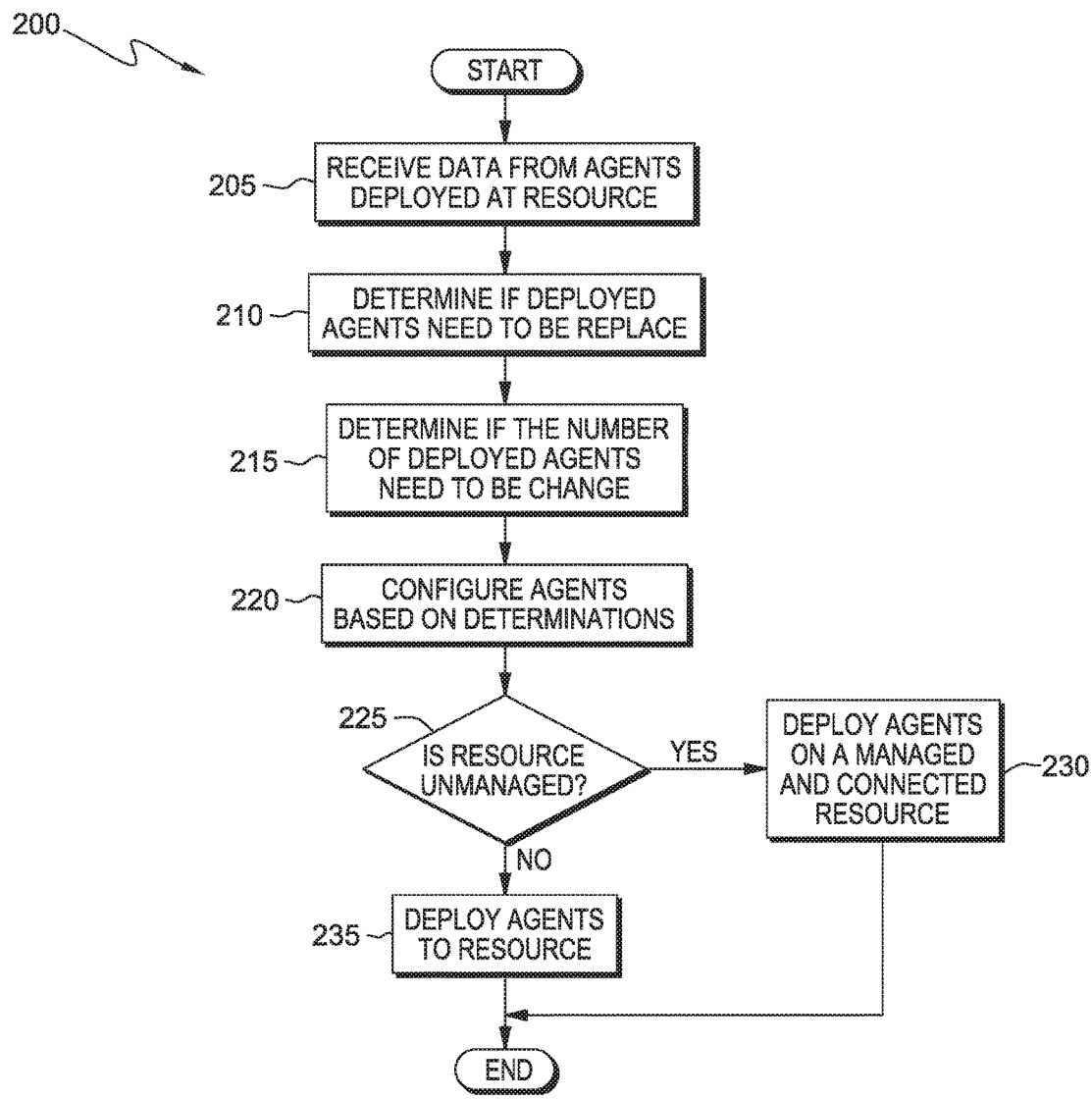
FIG. 2 is a flowchart depicting the operational steps of the agent replacement program of FIG. 1 in placing and replacing a plurality of agents in a cloud network based on received data and user input/default criteria, in accordance with an embodiment of the present invention.

FIG. 2 is a flowchart, 200, illustrating the operational steps of agent program 134 in replacing a plurality of agents in a cloud network based on received data and/or user/default criteria, in accordance with an embodiment of the invention. In the exemplary embodiment, agent program 134 receives data from agents 114 and agents 118 deployed at computing device 112 and computing device 116 (step 205). In the exemplary embodiment, the data received from agents 114 and agents 118 include information regarding the network traffic experienced at the resource, i.e., computing device 112 and/or computing device 116; and information regarding a need for one or more agents capable of performing a different monitoring task or a different function. For example, if computing device 112 has been upgraded or has received a supplementary software or hardware addition that the current agents, agents 114, are not capable of monitoring, agents 114 may transmit data to agent program 134 detailing the new addition or upgrade and the deficiency of the capabilities of agents 114 in being able to monitor the addition or upgrade.

Agent program 134 then determines if, based on the received data and default/user input criteria, agents 114 and agents 118 need to be replaced (step 210). For example, if agent program 134 receives data from agents 114 and agents 118 deployed at computing device 112 and computing device 116 indicating a need to change the function of the agents, agent program 134 may replace some agents with agents capable of performing the required function. In other embodiments, agent program 134 may also receive data from agents 114 and agents 118 detailing a need for a different type of agent to be deployed to computing device 112 and/or computing device 116, however, agents 114 and agents 118 may still be needed. In this embodiment, rather than replacing some or all of agents 114 and agents 118, agent program 134 may deploy additional agents capable of performing the required function or monitoring task. For example, if agent program 134 receives data from agents 114 indicating a need to deploy intrusion detection agents to computing device 112, agent program 134 may determine, based on user input criteria, to deploy 50 intrusion detection agents to computing device 112 without replacing any of the agents already present on computing device 112.

Agent program 134 then determines if the number of deployed agents monitoring computing device 112 and computing device 116 needs to be changed based on the received data and default/user input criteria (step 215). For example, if agent program 134 receives data from agents 114 and agents 118 indicating an increase in traffic to computing device 112 and computing device 116, agent program 134 may determine, based on user input criteria, to increase the number of agents located at computing device 112 and computing device 116 from, 50 agents to 100 agents. In other embodiments, if agent program 134 receives data from agents 114 indicating a decrease in traffic to computing device 112, agent program 134 may determine, based on user input/default criteria, to recall 25 already deployed agents on computing device 112. Based on the determinations, agent program 134 configures agents for deployment to computing device 112 (step 220).

Agent program 134 then determines if the resource the agents are being deployed to is an unmanaged resource (decision 225). In the exemplary embodiment, a resource is considered an unmanaged resource if, due to network connectivity issues, agent program 134 is unable to connect to the resource or if the resource is unable to support agent software. If, based on data received from agents 114 and agents 118, agent program 134 determines that the resource is unmanaged (decision 225, "YES" branch), agent program 134 deploys proxy agents to a computing device that sits between agent program 134 and the resource to continuously poll the resource for information that is transmitted to agent program 134 (step 230). For example, if agent program 134 determines that computing device 112 is an unmanaged resource, agent program 134 may then deploy 50 proxy agents to a computing device that sits between agent program 134 (server 130) and computing device 112 to continuously poll information regarding traffic flow on computing device 112. The proxy agents then transmit the gathered information to agent program 134.

If agent program 134 determines that the resource is managed (decision 225, "NO" branch), agent program 134 deploys agents directly to the resource (step 235). For example, if agent program 134 receives data from agents 118 indicating an increase in traffic on computing device 116 and agent program 134 determines that computing device 116 is a managed resource; agent program 134 may deploy 50 monitoring agents directly to computing device 116.

Figure 3:
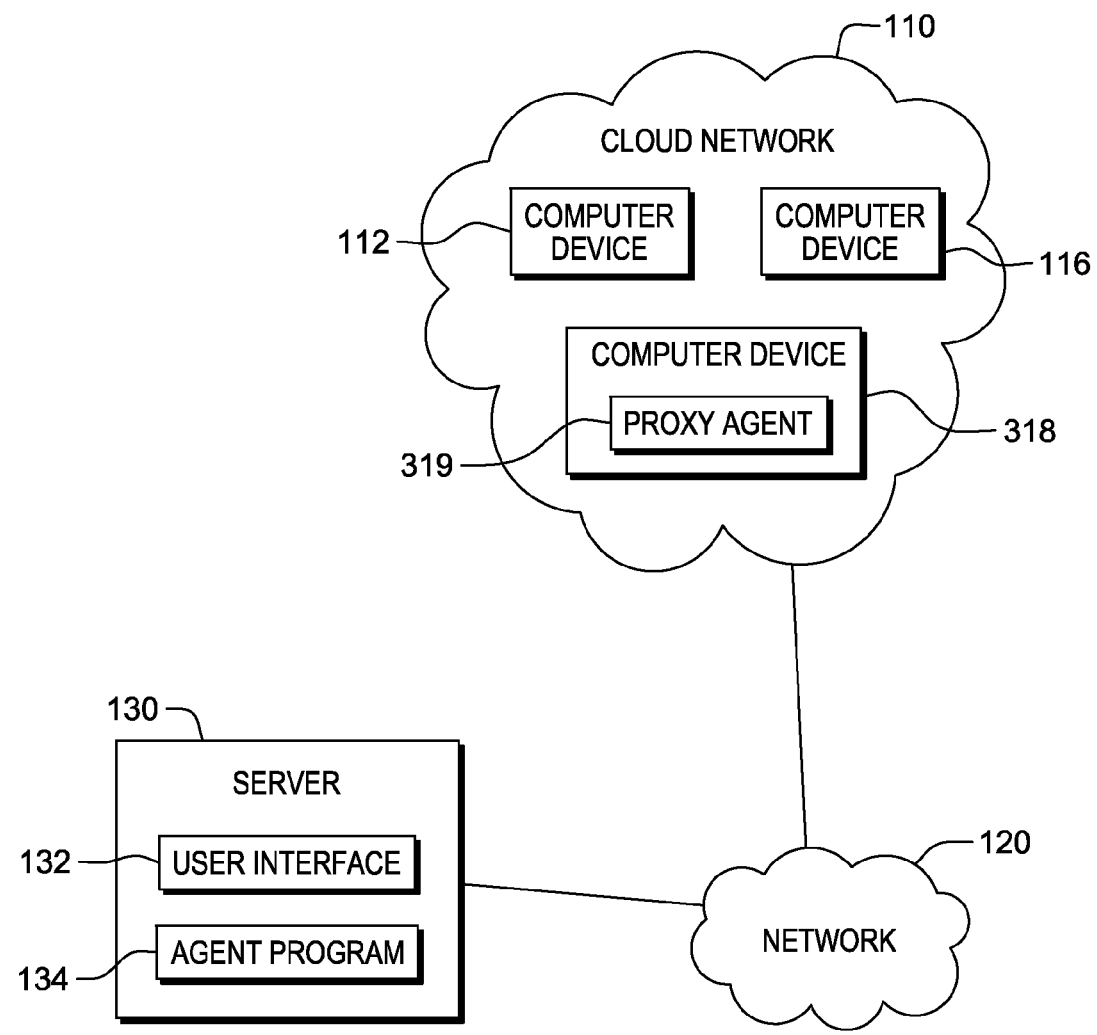
FIG. 3 is a block diagram illustrating agent placement program of FIG. 1, in placing and replacing a plurality of agents on unmanaged resources within a cloud network based on received data and user input/default criteria, in accordance with an embodiment of the present invention.

FIG. 3 is a block diagram illustrating agent program 134 placing proxy agent 319 on computing device 318 to monitor unmanaged resources in cloud network 110. As described above, if agent program 134 determines that the resource(s) is unmanaged, such as computing devices 112 or 116, agent program 134 deploys proxy agent 319 to computing device 318, which is a managed resource capable of monitoring computing device 112 and computing device 116 and transmitting the information to agent program 134 via network 120.

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention, as defined by the accompanying claims.

Figure 4:
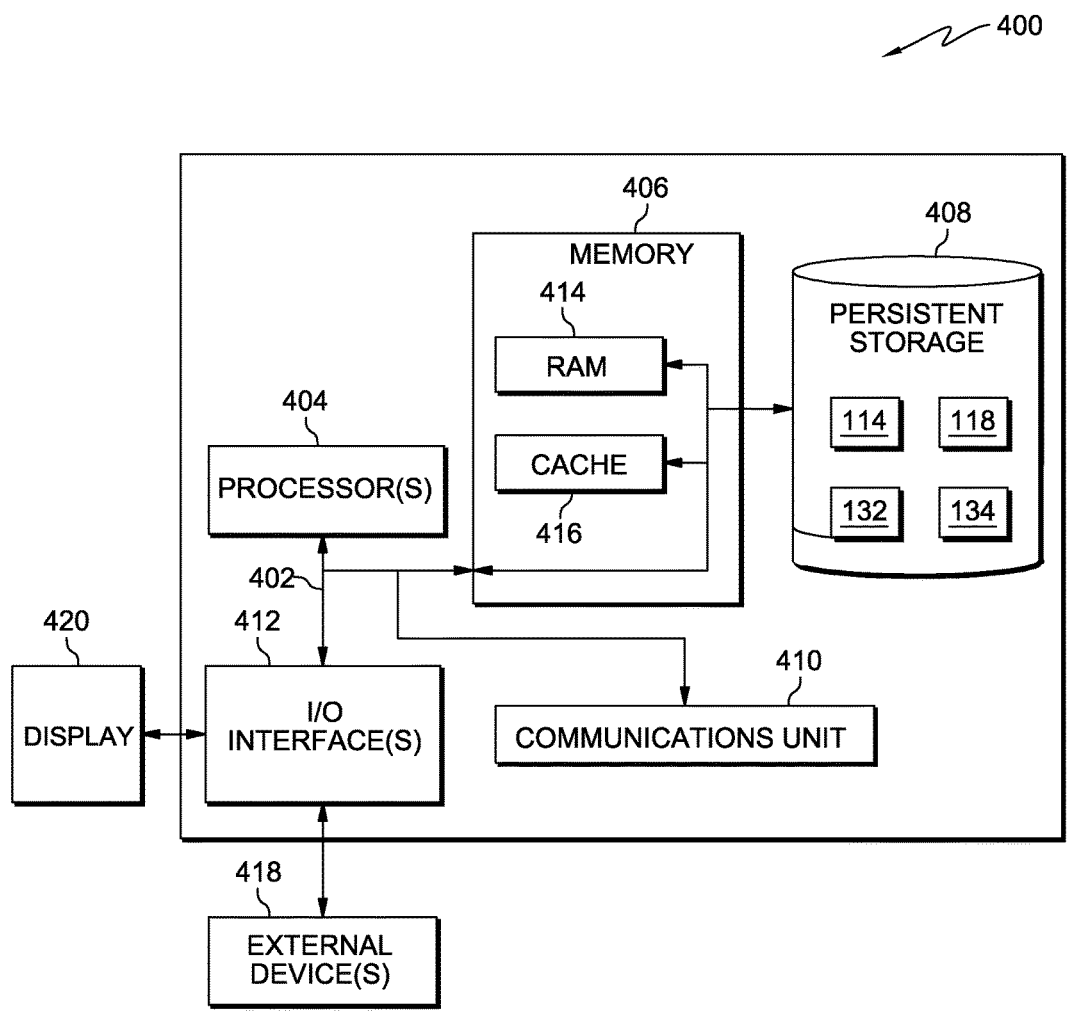
FIG. 4 is a block diagram depicting the hardware components of the agent replacement system of FIG. 1, in accordance with an embodiment of the invention.

FIG. 4 depicts a block diagram of respective components of cloud network 110, computing device 112, computing device 116 and server 130 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Cloud network 110, computing device 112, computing device 116 and server 130 include respective communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

The programs agents 114 stored in computing device 112; agents 118 stored in computing device 116; and agent program 134 in server 130 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. The programs agents 114 stored in computing device 112; agents 118 stored in computing device 116; and agent program 134 in server 130 may be downloaded to persistent storage 408 through communications unit 410.

I/O interface(s) 412 allows for input and output of data with other devices that may be connected to cloud network 110, computing device 112, computing device 116 and server 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., the program agent program 134 in server 130, can be stored on such portable computer-readable storage media and can be loaded onto persistent storage 408 via I/O interface(s) 412. I/O interface(s) 412 can also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and, thus, the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for configuring a cloud network, the method comprising:
   receiving information from one or more agents, wherein the one or more agents monitor one or more resources in a cloud network, wherein the step of receiving information from the one or more agents further includes: the one or more agents determining that the one or more resources have been updated, and the one or more agents identifying one or more deficiencies of capability of the one or more agents in monitoring the one or more resources;
   determining that the configuration of the one or more agents monitoring the one or more resources needs to be changed based on at least the information received from the one or more agents; and
   changing the configuration of the one or more agents monitoring the one or more resources based on at least the information received from the one or more agents.

2. The method of claim 1, further comprising:
   determining that the one or more resources are unmanaged resources; and
   based on determining that the one or more resources are unmanaged resources, deploying one or more to another resource, wherein the other resource is a managed resource and is capable of connecting to the one or more resources.

3. The method of claim 1, wherein the step of determining that the configuration of the one or more agents monitoring the one or more resources needs to be changed is based on information received from the one or more agents and a default criteria.

4. The method of claim 1, wherein the step of determining that the configuration of the one or more agents monitoring the one or more resources need to be changed is based on information received from the one or more agents and a user input.

5. The method of claim 1, further comprising:
- determining that the number of the one or more agents monitoring the one or more resources needs to be changed based on at least the information received from the one or more agents; and
- changing the number of the one or more agents monitoring the one or more resources.

6. The method of claim 1, further comprising:
- determining that the type of the one or more agents monitoring the one or more resources needs to be changed based on at least the information received from the one or more agents; and
- replacing the one or more agents monitoring the one or more resources with one or more agents of a different type.

7. The method of claim 1, wherein the information received from the one or more agents includes one or more of an amount of memory availability and an amount of CPU availability, the amount of information the one or more agents are capable of capturing, and an amount of traffic at the one or more resources.

* * * * *